3,118,222
PROCESSES FOR SHEATHING THE FUEL
ELEMENTS OF NUCLEAR REACTORS
Claude Beernaert, Lille, France, assignor to Commissariat
a l'Energie Atomique, Paris, France
Filed May 5, 1960, Ser. No. 27,145
Claims priority, application France May 11, 1959
6 Claims. (Cl. 29—514)

The present invention relates to improvements in known processes for sheathing or cladding fuel elements of nuclear reactors to avoid variations in thickness of the sheath during the forming operation.

In heterogeneous atomic reactors, the fuel is generally in the shape of rods enveloped in a sheath that provides good mechanical properties for the assembly and insulates the fuel against contact with the cooling fluid.

The use in such reactors, of fuels which are less thermally conductive than metallic uranium, such as, for instance, uranium oxide or carbide, may induce elevated temperature gradients and excessive temperature differences within the fuel.

To provide sufficient resistance to prevailing mechanical stresses, the thickness of the sheath is usually increased but this leads to an increased neutron absorption and interferes with heat transfer.

The fuel is sometimes divided into short rods of various diameters to overcome these difficulties, which rods are stacked internally of a thin sheath of sheet metal which is then formed on the rods to provide a filled fuel element which may have relief zones. Cylindrical rings of fuel have also been used, in contact or not, and of the same thickness or of differing thickness stacked in the sheath, which sheath is formed by two concentric tubes engaging the rings to provide a cylindrical hollow element having external and/or internal relief zones. The fuel may also be distributed in spaced lengths between two thin pieces of sheet metal joined between the fuel elements.

In all cases pressure forming of the sheath employs a mandrel in the place of the fuel when the fuel is not mechanically strong enough to resist the stresses prevailing during the pressure forming operation.

The various types of sheaths described above provide homogeneity of temperature within the fuel and give improved rigidity to the fuel element without increasing its thickness.

The same advantages can be obtained by dividing the fuel into a series of slender and parallel rods each being mounted internally in a primary sheath in contact with the surface of the rod, the several primary sheaths being linked together by means of extensions of the primary sheaths. The sheaths form fuel element unit shaped as a cluster.

It has been found that, without changing the distribution of the fuel of these clusters, it is possible to produce a one piece sheath which does not require joining the primary sheaths. This one piece sheath is common to all the rods and embraces the shape of each of the fuel rods.

The production of such a sheath presents certain problems. If the sheathing process applies by plastic deformation under cold or hot conditions, a thin piece of sheet metal on divided fuel elements, when the latter are sufficiently strong mechanically (metallic uranium for example) or by deformation on removable mandrels of the same shape and size of the fuel elements, variations in the thickness of the sheath may occur which are detrimental to the good mechanical stability thereof. These variations in thickness are due to the fact that the area of the surface of the final sheath is somewhat different from that of the surface of the pieces of sheet metal (tubes or sheets) used as starting members for the shaping of the sheath.

Drawing in some zones of the sheath occurs when the various rods of fuel for the fuel element are disposed in space relation parallel to the generatrixes of a right circular cylinder and are held in place by a rigid armature holding the rods in their respective positions during plastic deformation of the tubes of thin sheet metal onto the fuel rods.

The present invention provides improvements in which the sheath is a thin piece of sheet metal shaped over the parallel fuel rods employing the plastic properties of the metal and the properties of a deformable armature. The armature is removed after shaping of the sheath. During shaping of the sheath the sheath is not changed in thickness or in area, because the various rods are displaced while retaining their respective positions.

The fuel is distributed in a plurality of spaced parallel rods and the sheath is common to the several rods. Parts of the sheath conform to the shape of the rods and the sheath between the rods is in contact and links the rods together.

The deformable armature is put in position before shaping of the sheath. The armature maintains the relative positions of the several rods, so that the area of the surface of the piece of sheet metal remains constant during the forming of the cluster. When it is stated that the respective positions of the rods is maintained, it is to be understood that the geometric figure formed by the axes of the several rods remains homothetic.

A pliable armature is used so that this geometric figure may remain homothetic. The armature may be a plastic and relatively uncompressible material, such as the elastomers, or it may be a deformable network of metallic wires stretched longitudinally between the pieces of sheet metal. The wire type armature is inserted in the space between the pieces of sheet metal to be formed onto the rods. Drawing of the sheet metal to form the cluster is uniform because of the properties of this armature.

Where longitudinal metallic wires are used in the armature the wires are disposed internally of a hollow rod occupying the space for the fuel, and they are tensioned by means of springs making it possible for small lateral displacements to take place, during the plastic deformation of the pieces of sheet metal. Each of the metallic wires constituting the armature may comprise two lengths linked together by a calibrated spring. A metallic piece can be used inside the hollow rods connected into the wire links.

If, instead of wires, a deformable and relatively uncompressible material is used, this material is disposed within the space at the ends of the fuel elements between the pieces of sheet metal to be applied onto the rods and extends partially between the rods. This material, during compression of the sheet metal is deformed and flows over the ends of the rods allowing the rods to move closer to each other, in a uniform manner.

Plastic deformation of the pieces of thin sheet metal (tubular, flat or curved) from which the sheathing for the fuel elements is made can be produced by hydrostatic pressure under cold or hot conditions depending upon the characteristics of the metal of the sheath at various temperatures. This deformation is performed on the armature and on the rod: the rod being either the fuel element if sufficiently strong as in the case of metallic uranium, or a mandrel, which may be a hollow or solid steel rod.

After forming the sheath, the armature and the mandrels are removed from the sheath and, after removal, the fuel rods are inserted into the sheath. The longitudinal dimension of the pieces of sheet metal forming the sheath and of the armature are chosen so as to exceed the length of the fuel rods. When the sheath is formed of cylindrical elements, plugs are welded at the ends of the concentric sheet metal tubes, to provide a fluid tight assembly during the forming of the sheath. After forming of the sheath these plugs are removed in order to withdraw the armature and the mandrels, if used.

An annular piece may be mounted between the sheet metal pieces of the sheath, at either end thereof to form a fluid tight joint and these are removed after the sheath is formed. An impervious joint between the annular pieces and the sheet metal of the sheath is obtained by the use of an internal and external joint such as a torus joint when two concentric sheet metal tubes make up the sheath.

In order to improve the rigidity of the fuel elements, a link is provided as a part of the sheath between the fuel rods. This link may comprise spot welds or ring welds of the portions of the sheath drawn into engagement between the fuel rods.

When the sheath is formed by tubular elements arranged as concentric tubes, a cylindrical core with longitudinal flutes may be inserted into the internal tube. Plastic deformation then presses the sheath against this core and reproduces the shape of the flutes of the core on the sheath. Crimping of the two sheets of the sheath in contact between fuel rods is obtained and the rigidity of the fuel element is improved.

Annular fuel elements produced by the present invention, are closed by crown-plugs at both ends and are fluid tight. When the elements are other than annular, plugs are used at the tips of each rod to form a fluid tight assembly.

Preferred embodiments of the invention will be described hereinafter by way of example only referring to the schematic FIGURES 1 to 9 of the appended drawings of the invention.

In the various figures, corresponding parts bear identical reference numerals.

In order to simplify the description, it is assumed that the rods on which the fuel elements are formed are steel rods, corresponding to the fuel rods. It should be understood that these rods may be the fuel itself, when the fuel is metallic uranium, for example.

Figure 1:
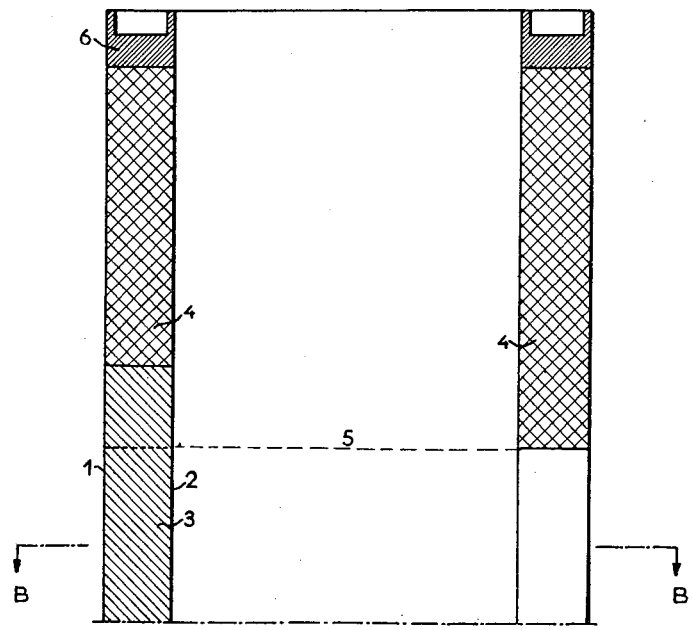
FIG. 1 shows an embodiment in which an armature of a deformable substance which is relatively uncompressible is used and is a section on the line AA of FIGURE 2, for sheathing a hollow cylindrical fuel element in which the fuel rods are parallel.
Figure 2:
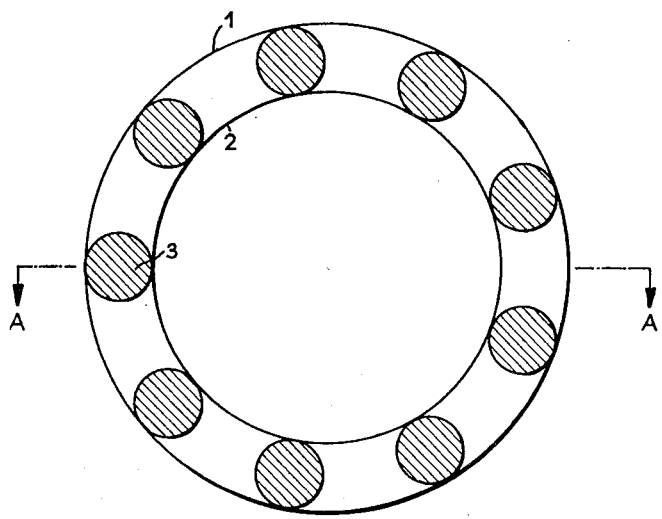
FIG. 2 is a sectional view on line BB of FIG. 1.

In FIGS. 1 and 2, concentric tubes of thin sheet metal are shown at 1 and 2; the steel rods at 3; and the deformable relatively uncompressible substance at 4. Substance 4 is disposed between the tubes 1 and 2 from the level shown by the plane 5 to crown-plugs 6 welded at the ends of tubes 1 and 2. The lower portion of the assembly is not shown and is identical to the upper portion.

Figure 3:
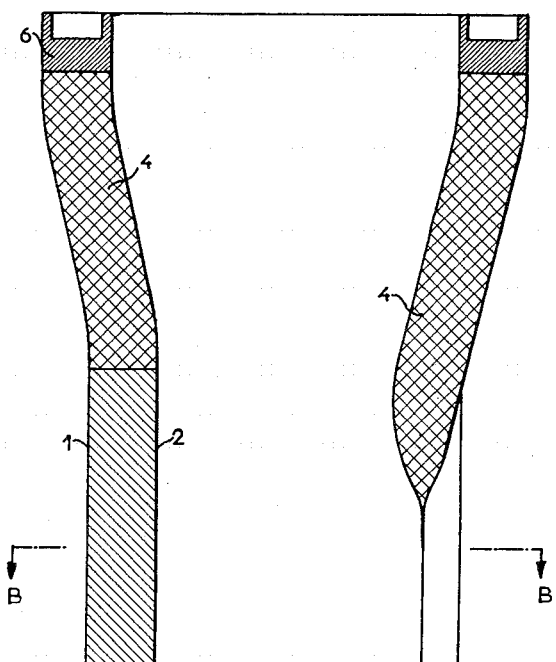
FIG. 3 is a sectional view on line AA of FIGS. 2 and 4, illustrating the structure resulting from drawing of the sheath elements shown in FIGS. 1 and 2.
Figure 4:
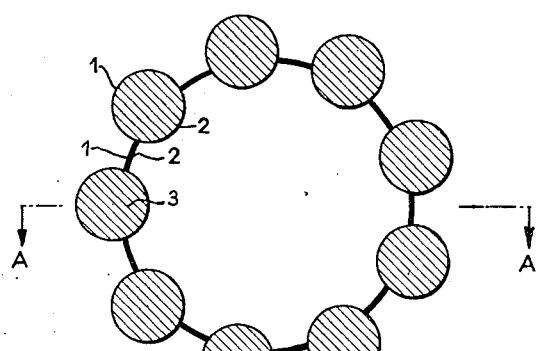
FIG. 4 is a sectional view on line BB of FIGS. 1 and 3, showing the final profile of the fuel element.

FIGS. 3 and 4 show the structure resulting from compression cold or hot in a hydraulic sheathing machine. During the sheathing steel rods 3 move closer to the center and sheet metal pieces 1 and 2 were not subjected to appreciable drawing. Crown-plugs 6 are then cut off to withdraw armature 4. Cutting the sheath above rods 3 permits their withdrawal and replacement by rods of fuel. A crown-plug of a known type, not shown, is thereafter welded at each end of the sheath.

To improve on the rigidity of the element, the contacting parts of tubes 1 and 2 are spot welded to form links between the cladded fuel rods.

Figure 5:
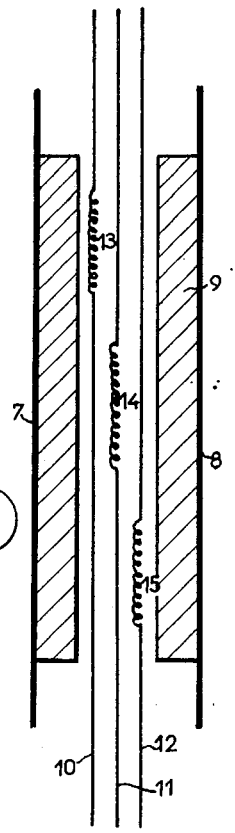
FIG. 5 is another embodiment of the present invention in which the deformable armature comprises metallic wires within a hollow rod.

In FIG. 5 two concentric tubes 7 and 8 are shown with hollow steel rod 9 in place of the fuel rod. The deformable armature inside rod 9 now comprises three metallic wires 10, 11 and 12 disposed in a triangle and tensioned by springs 13, 14, 15. The relative position of rod 9 with respect to the other rods in the assembly is maintained since the three wires 10, 11 and 12 allow small lateral displacements during compression of the assembly of sheath and rods 9.

Figure 6:
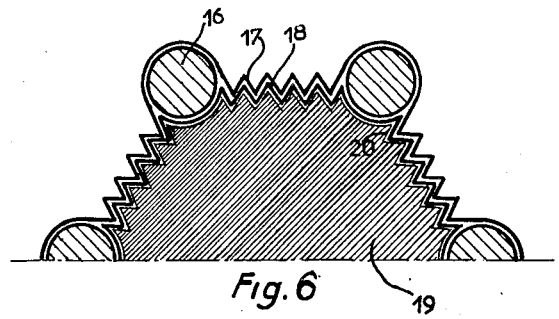
FIG. 6 is a partial sectional view of another embodiment of the present invention having improved rigidity of the fuel element.

FIG. 6 shows rods 16 occupying the space for the fuel rods after plastic deformation of the concentric tubes to provide metallic lands 17 and 18 in the sheath of the element. Compression of the tubes is carried out on an internal core 19 provided with longitudinal flutes having in transverse section a saw tooth shape as at 20. The profile of saw teeth 20 is reproduced as lands 17 and 18 of the sheath and increases the rigidity of the element: It is to be noted that core 19 can be used with the deformable armature 4 within the scope of the present invention.

Figure 7:
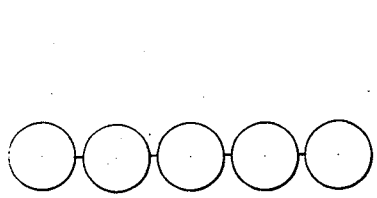
FIG. 7 is a transverse section of a flat fuel element made by the process of the present invention.

FIG. 7 is a transverse section of a flat fuel element according to the present invention.

Figure 8:
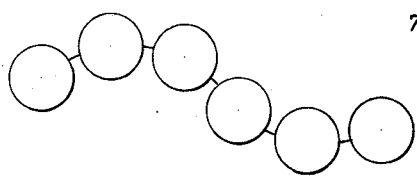
FIG. 8 is a transverse section of an S-shaped fuel element made by the process of the present invention.
Figure 9:
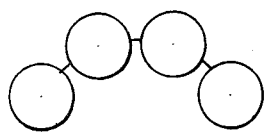
FIG. 9 is a transverse section of an arcuate fuel element made by the process of the present invention.

FIGS. 8 and 9 are transverse sections of S shaped and arcuate fuel elements, the shapes of which are intermediate between the cylindrical element of FIGS. 1 and 4 and the flat element of FIG. 7.

The embodiments of the invention in which an exclusive property or privilege is claimed are defined as follows:

1. In a process for cladding and forming a sheath for fuel elements of nuclear reactors with thin sheet metal to form a sheath the steps of spacing parallel rods between the sheets of metal, holding said rods in their relative positions by a plastic and relatively uncompressible substance disposed between said rods within the sheets of metal and compressing said sheets of metal around said rods and into engagement between said rods with lateral displacement of said rods during the forming of the sheath while maintaining the relative positions of said rods in the sheath whereby relatively little change in thickness or surface area of the sheath occurs during compression.

2. Process as described in claim 1 in which said rods are fuel rods.

3. Process as described in claim 1 in which said rods are mandrels, the further step of removing said rods after forming the sheath.

4. Process as described in claim 1 in which said substance is mounted at the longitudinal extremities of said rods.

5. In a process as described in claim 1, the further step of welding together the sheets of metal in engagement between said rods.

6. In a process as described in claim 1 the further step of longitudinally fluting the sheets of metal in engagement between said rods.

References Cited in the file of this patent
UNITED STATES PATENTS
2,947,676    Zanbrow _____ Aug. 2, 1960